United States Patent
Lee et al.

(10) Patent No.: US 10,314,059 B2
(45) Date of Patent: Jun. 4, 2019

(54) COMMUNICATION METHOD IN MOBILE COMMUNICATION SYSTEM USING UNLICENSED FREQUENCY BAND AND APPARATUS THEREFOR

(71) Applicant: Samsung Electronics Co., Ltd., Gyeonggi-do (KR)

(72) Inventors: Sung-Jin Lee, Bucheon-si (KR); Jung-Soo Jung, Seongnam-si (KR); Sun-Heui Ryoo, Yongin-si (KR); Jung-Min Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 15/524,935

(22) PCT Filed: Nov. 9, 2015

(86) PCT No.: PCT/KR2015/011992
§ 371 (c)(1),
(2) Date: May 5, 2017

(87) PCT Pub. No.: WO2016/072816
PCT Pub. Date: May 12, 2016

(65) Prior Publication Data
US 2018/0139767 A1  May 17, 2018

(30) Foreign Application Priority Data
Nov. 7, 2014  (KR) .................. 10-2014-0154402

(51) Int. Cl.
*H04W 72/12* (2009.01)
*H04L 5/00* (2006.01)
*H04W 16/14* (2009.01)
*H04W 72/04* (2009.01)
*H04L 1/16* (2006.01)
*H04W 74/08* (2009.01)

(52) U.S. Cl.
CPC .......... *H04W 72/1205* (2013.01); *H04L 1/16* (2013.01); *H04L 5/001* (2013.01); *H04L 5/0053* (2013.01);
(Continued)

(58) Field of Classification Search
CPC ......... H04W 72/1205; H04W 72/1273; H04W 72/0446; H04W 72/1289; H04W 16/14;
(Continued)

(56) References Cited

U.S. PATENT DOCUMENTS

| 8,837,422 | B2 | 9/2014 | Chen et al. |
| 2012/0044847 | A1 | 2/2012 | Chang |

(Continued)

FOREIGN PATENT DOCUMENTS

| WO | 2012/116489 A1 | 9/2012 |
| WO | 2013/006988 A1 | 1/2013 |
| WO | 2014/111309 A1 | 7/2014 |

OTHER PUBLICATIONS

3GPP TSF RAN WG1, #78, R1-144042 (Candidate solutions for LAA Operation, R1-144042).*
(Continued)

*Primary Examiner* — Lakeram Jangbahadur

(57) ABSTRACT

The present disclosures provides a method in a communication system for scheduling, by a base station, a terminal which uses an unlicensed band channel, comprising: a step in which a base station transmits scheduling information with respect to an unlicensed band to a terminal through a licensed band channel in a first subframe; a step in which the base station performs a search for the unlicensed band channel; and a step in which, if the search for the unlicensed band channel is successful, downlink data is transmitted to the terminal through the unlicensed band channel on the basis of the scheduling information.

16 Claims, 11 Drawing Sheets

(52) U.S. Cl.
CPC .......... *H04L 5/0098* (2013.01); *H04W 16/14* (2013.01); *H04W 72/0446* (2013.01); *H04W 72/1273* (2013.01); *H04W 72/1289* (2013.01); *H04W 74/0808* (2013.01)

(58) Field of Classification Search
CPC .... H04W 28/04; H04W 72/12; H04L 5/0053; H04L 5/001; H04L 5/0098; Y02D 70/126; Y02D 70/24
See application file for complete search history.

(56) References Cited

U.S. PATENT DOCUMENTS

| | | | | |
|---|---|---|---|---|
| 2015/0327297 | A1* | 11/2015 | Nilsson | H04W 72/1215 370/336 |
| 2017/0118765 | A1* | 4/2017 | Kalhan | H04W 76/14 |
| 2017/0280479 | A1* | 9/2017 | Frenne | H04W 16/14 |
| 2017/0310434 | A1* | 10/2017 | Harada | H04B 17/318 |
| 2018/0175975 | A1* | 6/2018 | Um | H04L 1/1816 |

OTHER PUBLICATIONS

"Views on Required Functionalities and Design Targets for LAA," 3GPP TSG-RAN WG1 #78bis, R1-143878, Samsung, Ljubljana, Slovenia, Oct. 6-10, 2014, 5 pages.

"Candidate Solutions for LAA Operation," 3GPP TSG RAN WG1 Meeting #78bis, R1-144042, LG Electronics, Ljubljana, Slovenia, Oct. 6-10, 2014, 8 pages.

"Inter-Operator and Inter-RAT Co-Existence Techniques for LAA Using LTE," 3GPP TSG RAN WG1 Meeting #78bis, R1-144150, NTT Docomo, Ljubljana, Slovenia, Oct. 6-10, 2014, 8 pages.

* cited by examiner

COMMUNICATION METHOD IN MOBILE COMMUNICATION SYSTEM USING UNLICENSED FREQUENCY BAND AND APPARATUS THEREFOR

CROSS-REFERENCE TO RELATED APPLICATION(S)

This application is a U.S. National Stage application under 35 U.S.C. § 365 of an International application filed on Nov. 9, 2015 and assigned application number PCT/KR2015/011992, which claimed the benefit of a Korean application filed on Nov. 7, 2014 in the Korean Patent Office and assigned application number 10-2014-0154402, the entire disclosure of each of which is hereby incorporated by reference.

TECHNICAL FIELD

The present disclosure relates to a communication technique in a mobile communication system using an unlicensed frequency band and, to a downlink scheduling method for communication equipment of a mobile communication system operating in an unlicensed frequency band and an apparatus therefor.

BACKGROUND

To meet the demand for ever-increasing wireless data traffic since commercialization of the 4th generation (4G) communication system, there have been efforts to develop an advanced 5th generation (5G) or pre-5G communication system. The 5G or pre-5G communication system is called a beyond 4G network communication system or post LTE system.

Implementation of the 5G communication system using ultra-frequency (mmWave) bands, e.g., 60 GHz bands is considered to achieve higher data rates. To reduce propagation loss of radio waves and increase a transmission distance in the ultra-frequency bands, beamforming, massive multiple-input multiple-output (MIMO), full dimensional MIMO (FD-MIMO), array antenna, analog beamforming, large-scale antenna techniques are under discussion.

To improve system networks, technologies for advanced small cells, cloud radio access networks (RANs), ultra-dense networks, device to device (D2D) communication, wireless backhaul, moving networks, cooperative communication, coordinated multi-points (CoMP), reception-end interference cancellation and the like are also being developed in the 5G communication system.

In addition, in the 5G system, an advanced coding modulation (ACM), e.g., hybrid frequency-shift keying (FSK) and quadrature amplitude modulation (QAM) modulation (FQAM), sliding window superposition coding (SWSC), and an advanced access technology, e.g., filter bank multi carrier (FBMC), non-orthogonal multiple access (NOMA), sparse code multiple access (SCMA) are being developed.

Recently, a series of studies for operating a Long Term Evolution (LTE) system in an unlicensed frequency band have been actively underway. The LTE system operating in an unlicensed frequency band is referred to as an LTE-U (LTE-Unlicensed or Unlicensed LTE) system.

An unlicensed frequency band is not a frequency band allocated to only one specific system. Therefore, when any communication system is licensed for use by a regulatory authority such as the Federal Communications Commission (FCC), and complies with the rules set by the regulatory authority, communication can be performed by transmitting or receiving a wireless signal through an unlicensed frequency band. Wi-Fi and Bluetooth, which are currently used by many people, correspond to a typical technology that uses an unlicensed band.

Recently, as mobile data traffic through LTE and LTE-Advanced (LTE-A) has significantly increased, telecommunication service providers have shown great interest in securing a frequency band that can accommodate the mobile data traffic. The most basic method therefor is to purchase a licensed frequency band allocated for an LTE system. However, since frequency resources are a public resource which is strictly managed and controlled by a nation, purchasing a licensed frequency band requires a lot of time, costs and complex procedures. Therefore, some communication service providers and communication chip manufacturers try to operate an LTE system in an unlicensed band near 5 GHz. In the 5 GHz band, an LTE system is known to be able to use a wide frequency band of about 500 MHz. Therefore, it is expected that the effective use of an unlicensed frequency band of 5 GHz will greatly increase the capacity of an LTE system.

However, an unlicensed frequency band near 5 GHz can be used for an LTE system as well as other communication systems (typically, a Wi-Fi system). Therefore, a method for efficiently occupying a channel by competing with communication apparatuses of other communication systems for channel occupation while following all the necessary regulations in a corresponding unlicensed frequency band, and a downlink scheduling method are required.

In a communication system using an unlicensed frequency band, data scheduling is possible after Listen-Before-Talk (LBT). The LBT refers to a scheme of communicating only when a usable channel is detected before data transmission or reception and a Clear Channel Assessment (CCA) condition (meaning that only energy less than or equal to −82 dBm is generally detected, differing with countries) is satisfied. However, in an LTE system, a physical downlink control channel (PDCCH) is transmitted to the front of every sub-frame and data scheduling is possible through the PDCCH. Therefore, it can be seen that a scheduling procedure of a general LTE system for data scheduling through a PDCCH, without checking whether a channel is available, is not suitable for an LTE-U system. Therefore, in order for LTE-U to operate in an unlicensed band, unlike a Wi-Fi system, a base station should listen to a corresponding unlicensed band and identify whether the CCA condition is satisfied. When the CCA condition is satisfied, the base station should continuously transmit a preservation signal to occupy a channel until PDCCH signals are transmitted to user equipments. Accordingly, the base station wastes an extreme amount of power due to the transmission of the preservation signal for a relatively long time, and this may interfere with channel occupation of other communication apparatuses communicating in an unlicensed band. Furthermore, the overall channel utilization efficiency in an unlicensed band also decreases.

SUMMARY

The present disclosure provides a method for effectively occupying a channel by a user equipment in an LTE-U system operating in an unlicensed band.

In addition, the present disclosure provides a scheduling method for allocating a resource to a user equipment by a base station in an LTE-U system operating an unlicensed band.

In addition, the present disclosure provides a scheduling method for minimizing power consumption of a user equipment in an LTE-U system operating in an unlicensed band.

The present disclosure relates to a method for scheduling a user equipment using an unlicensed band channel by a base station in a mobile communication system, and proposes a method including the steps of: checking a CCA condition with respect to an unlicensed band channel by a base station; transmitting a preservation signal until scheduling control information or scheduled data information is transmitted; transmitting scheduling information with respect to an unlicensed band to a user equipment by the base station through a licensed band channel in the closest symbol or the closest new sub-frame; and transmitting downlink data to the user equipment through the unlicensed band channel on the basis of the scheduling information when a search for the unlicensed band channel succeeds, and a method for transmitting success/failure information in the next sub-frame in preparation for a case of where the search for the unlicensed band channel fails.

The present disclosure relates to a method for scheduling a user equipment using an unlicensed band channel by a base station in a communication system, and proposes a method including the steps of: checking a CCA condition with respect to an unlicensed band channel by a base station; transmitting scheduling information on an unlicensed band to a user equipment by the base station through a licensed band channel in the closest symbol or the closest new sub-frame; and transmitting an indication message for a DRX control to the user equipment in a sub-frame preceding an on duration of the user equipment operating in a Discontinuous Reception (DRX) mode.

The present disclosure relates to a base station apparatus for scheduling a user equipment using an unlicensed band channel in a communication system, and proposes a base station and a user equipment apparatus that is scheduled according to an operation of the base station, the base station including: a control unit that controls to check a CCA condition with respect to a channel in a licensed band channel, to transmit a preservation signal to the unlicensed band when the condition is satisfied, and to transmit information on an unlicensed band channel through which scheduling information is to be transmitted to the user equipment in the closest symbol or in the closest new sub-frame; and a transmission and reception unit that performs a transmission or reception operation of a signal or a message according to a control of the control unit.

DETAILED DESCRIPTION

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the terms should be defined on the basis of the contents throughout the specification.

In the detailed description of the present disclosure, an example of interpretable meanings of some terms used in the present disclosure is proposed. However, it is noted that the terms are not limited to the examples of the construable meanings which are proposed below.

In the present disclosure, a base station is a subject communicating with a user equipment or any entity of a network, and may be referred to as a BS, a NodeB (NB), an eNodB (eNB), an Access Point (AP), or the like. In the present disclosure, a base station may be interpreted to mean a base station operating in an unlicensed band, that is, an LTE-U base station.

In the present disclosure, a user equipment is a subject communicating with a base station, and may be referred to as a UE, a Mobile Station (MS), a Mobile Equipment (ME), a device, a terminal, or the like. In the present disclosure, a user equipment may be interpreted to mean a user equipment operating in an unlicensed band, that is, an LTE-U user equipment.

In the present disclosure, the LTE-U user equipment refers to an LTE user equipment operating in a licensed band and an unlicensed band by carrier aggregation (CA). Therefore, the LTE-U user equipment and the LTE user equipment may be used with the same meaning. Likewise, in the present disclosure, the LTE-U base station refers to an LTE base station operating in an unlicensed band. Therefore, the LTE-U base station and the LTE base station may be used interchangeably.

In the present disclosure, an operation frequency may also be referred to as a channel, a cell, or a carrier. That is, in a CA technique, a plurality of frequency bands may be used by an LTE system, and the frequency bands may be referred to as channels, PCells, SCells, or carriers in the present disclosure.

The present disclosure proposes a first method in which a base station in an LTE-U system checks a channel validity (CCA check) in an unlicensed band and then transmits a preservation signal until control signals (PDCCH, EPDCCH) or all appointed signals are transmitted in the next sub-frame.

Figure 1:
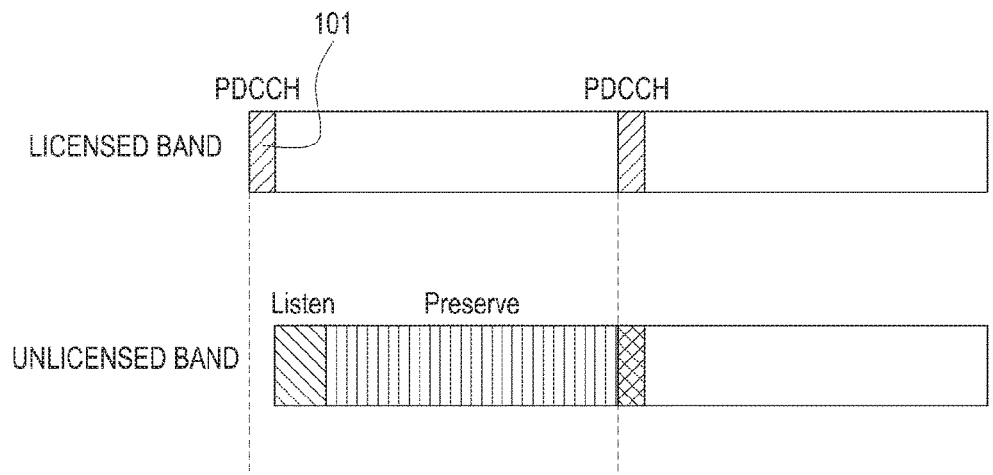
FIG. 1 illustrates an example of a scheduling method in an LTE-U system according to a first method of the present disclosure.

FIG. 1 illustrates an example of a scheduling method in an LTE-U system according to a first method of the present disclosure.

As shown in FIG. 1, according to the first method of the present disclosure, a base station firstly identifies whether an unlicensed band channel satisfies a CCA condition. Further, when the CCA condition is satisfied, the base station transmits scheduling information on an unlicensed band to a user equipment through a PDCCH 101 of a licensed band in a new sub-frame in which transmission is performed at the closest time point, and searches for the unlicensed band channel. The base station transmits scheduling information such as LBT-related information and band information to the user equipment. The LBT-related information may include a start time at which the user equipment starts listening, an end time, and a listening duration, and the band information may include information on a band for performing scheduling. The PDCCH including scheduling information may be transmitted in a broadcast manner, and thus user equipments which set a corresponding unlicensed band to be used for an SCell may receive related-information and utilize the related-information as needed. When a search for the unlicensed band channel succeeds, the base station transmits a preservation signal until the new sub-frame is transmitted. The base station transmits downlink data to a user equipment through an unlicensed band channel on the basis of control information received in a licensed band, after transmitting the preservation signal.

Next, the present disclosure proposes a second method in which a base station in an LTE-U system performs scheduling by using a PDCCH in a first sub-frame of a licensed band so that a preservation signal decreases.

Figure 2:
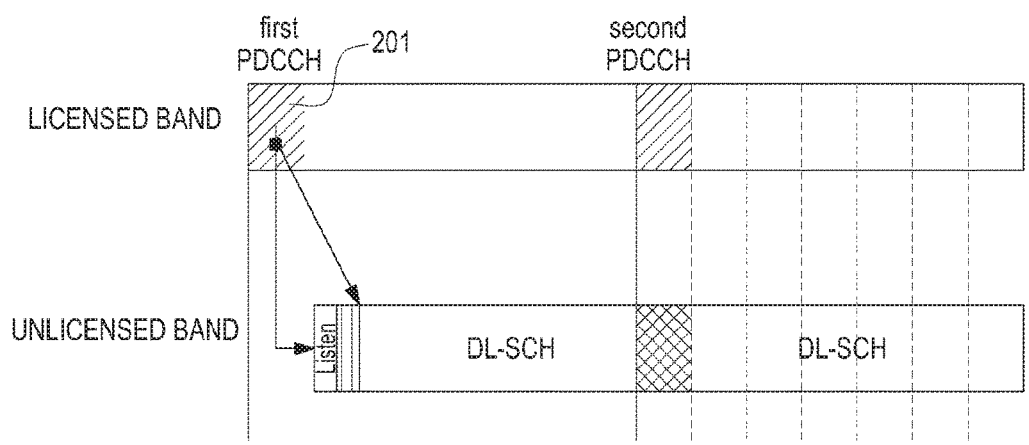
FIG. 2 illustrates an example of a scheduling method in an LTE-U system according to a second method of the present disclosure.

FIG. 2 illustrates an example of a scheduling method in an LTE-U system according to a second method of the present disclosure.

The base station transmits scheduling information such as LBT-related information and band information to a user equipment through a PDCCH 201 of a first sub-frame in a licensed band. The LBT-related information may include a start time at which the user equipment starts listening, a listening end time, and a listening duration, and the band information may include information on a band for performing scheduling. The PDCCH of the first sub-frame including the scheduling information may be transmitted in a broadcast manner. Therefore, user equipments which set the corresponding unlicensed band to be used for an SCell may receive related-information and utilize the related-information as needed. In addition, the PDCCH 201 of the first sub-frame including the scheduling information is transmitted through a symbol 203 firstly transmitted after the user equipment has occupied a channel. Accordingly, a section in which the base station transmits a preservation signal for occupying the channel may be minimized. The preservation signal may be used to identify synchronization information or identify a user equipment by transmitting a predetermined signal between the user equipment and the base station.

In addition, the base station may switch a resource area for transmitting a PDCCH after a third sub-frame from a licensed band to an unlicensed band in order to improve the resource efficiency of the unlicensed band. When the PDCCH after the third sub-frame is transmitted in the unlicensed band, the base station may inform the user equipment that the PDCCH after the third sub-frame will be transmitted in the unlicensed band through a PDCCH of a first or second sub-frame transmitted in the licensed band.

Figure 3:
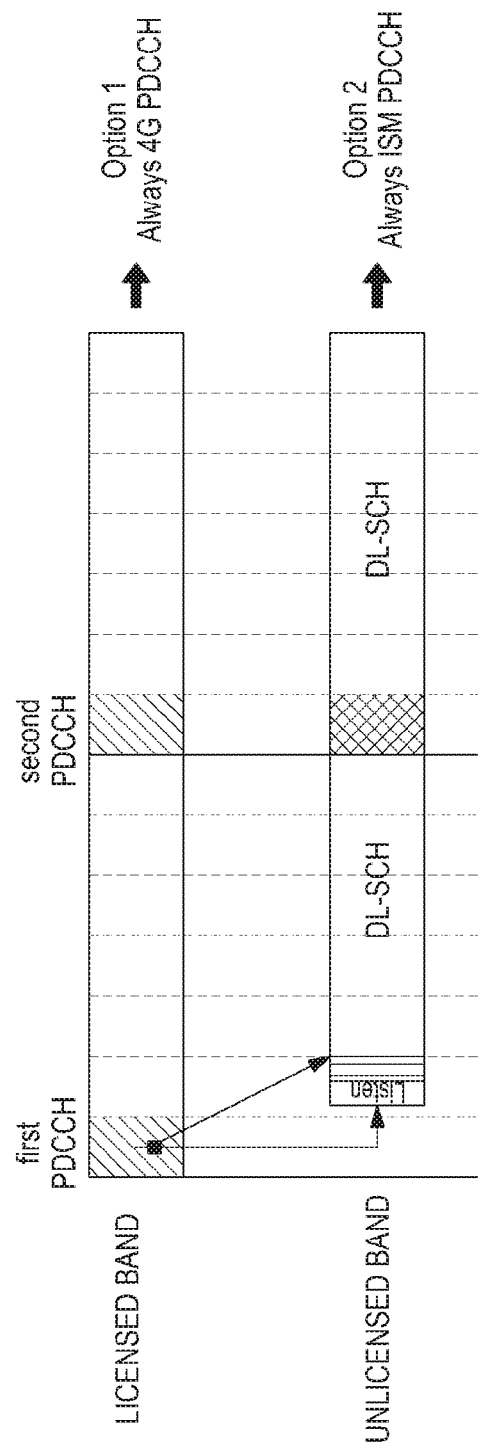
FIG. 3 illustrates an example in which it is notified that a third PDCCH and subsequent PDCCHs will be transmitted in an unlicensed band through a first or second PDCCH and a resource area for transmitting the third PDCCH and the subsequent PDCCHs is switched from a licensed band to an unlicensed band according to the present disclosure.

FIG. 3 illustrates an example in which it is notified that a third PDCCH and subsequent PDCCHs will be transmitted in an unlicensed band through a first or second PDCCH and a resource area for transmitting the third PDCCH and the subsequent PDCCHs is switched from a licensed band to an unlicensed band according to the present disclosure. In other words, option 1 indicates that a PDCCH is always transmitted in the licensed band, and option 2 indicates that a PDCCH is transmitted in the unlicensed band after the third sub-frame.

Figure 4:
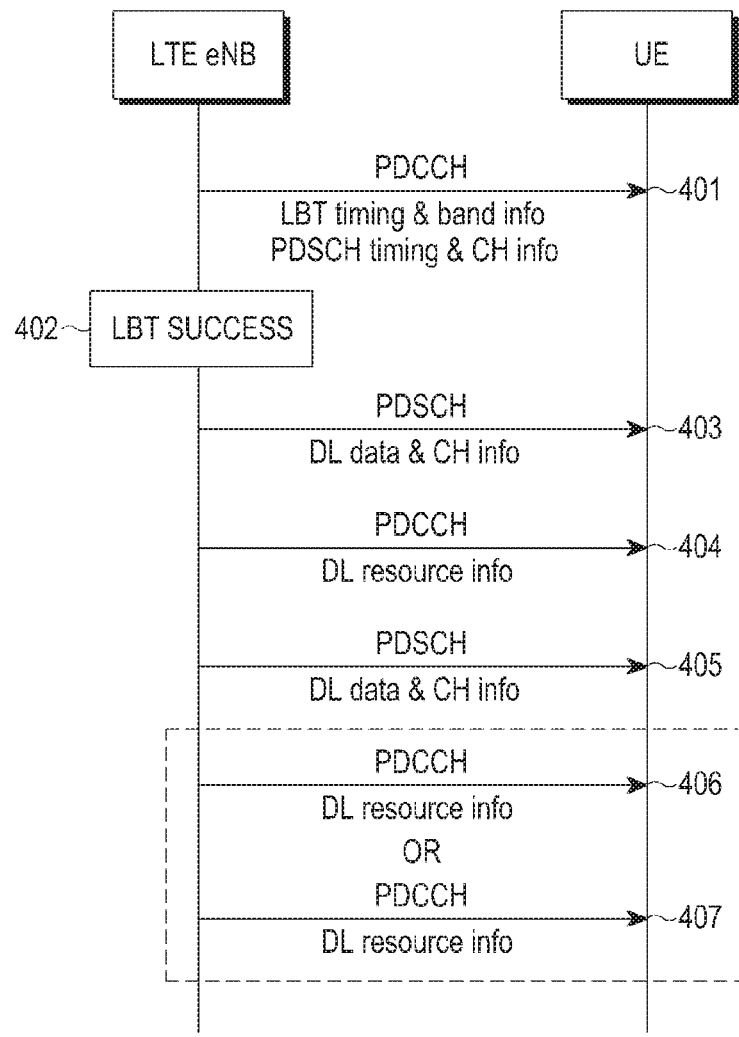
FIG. 4 illustrates a signal flow between a base station and a user equipment according to a second method of the present disclosure.

FIG. 4 illustrates a signal flow between a base station and a user equipment according to a second method of the present disclosure.

Referring to FIG. 4, the base station transmits scheduling information through a PDCCH of a first sub-frame in a licensed band (401). At this time, the scheduling information may include time information for LBT, band information to be listened for, and scheduling information on a PDSCH of an unlicensed band. The time information for LBT may include a listening start time, a listening end time, a retry start time in a case of a listening failure, and the maximum number of retries in a case of a listening failure.

The base station performs LBT on the received LBT information. When the LBT succeeds (402), the base station transmits downlink data to the user equipment through the PDSCH in a corresponding unlicensed band (403), and transmits information indicating the success or failure of the LBT and PDSCH information of the unlicensed band through a PDCCH of a second sub-frame in the licensed band (404). Further, the base station transmits downlink data to the user equipment through the PDSCH in the corresponding unlicensed band (405).

As described above in FIG. 3, when a resource area for transmitting the PDCCH after the third sub-frame is switched from the licensed band to the unlicensed band, information which informs that the PDCCH after the third sub-frame will be transmitted in the unlicensed band through a PDCCH may be further included in the operation 401 or the operation 404 of FIG. 4.

Thereafter, in the third sub-frame, downlink resource information is transmitted through a PDCCH of the licensed band or the unlicensed band (406, 407). A band between the licensed band the unlicensed band in the third sub-frame, a PDCCH of which is to be used to transmit downlink resource information, may be determined based on predetermined information or may be determined on the basis of information transmitted through the PDCCH in the operation 401 or the operation 404.

In addition, according to the second method of the present disclosure, a channel occupancy ratio of the unlicensed band may be considered for more effective scheduling. The occupancy ratio means a ratio of time when the magnitude of received power measured in a corresponding unlicensed band in a unit period is equal to or greater than a predetermined threshold value, and the scheduling according to the second method of the present disclosure may be performed only when the channel occupancy ratio of the unlicensed band is equal to or less than the threshold value.

However, when the scheduling according to the second method described above is performed, even when the LBT fails, the base station continuously transmits a PDCCH for scheduling to the user equipment, and accordingly the user equipment repeatedly decodes a received PDCCH. However, since the LBT has failed, the user equipment does not normally receive the PDCCH, and accordingly the user equipment transmits, to the base station, a NACK signal for a request for retransmission of a PDCCH which has not been received.

Accordingly, the present disclosure proposes a third method for preventing unnecessary decoding and NACK signal transmission by a user equipment when LBT fails.

Figure 5:
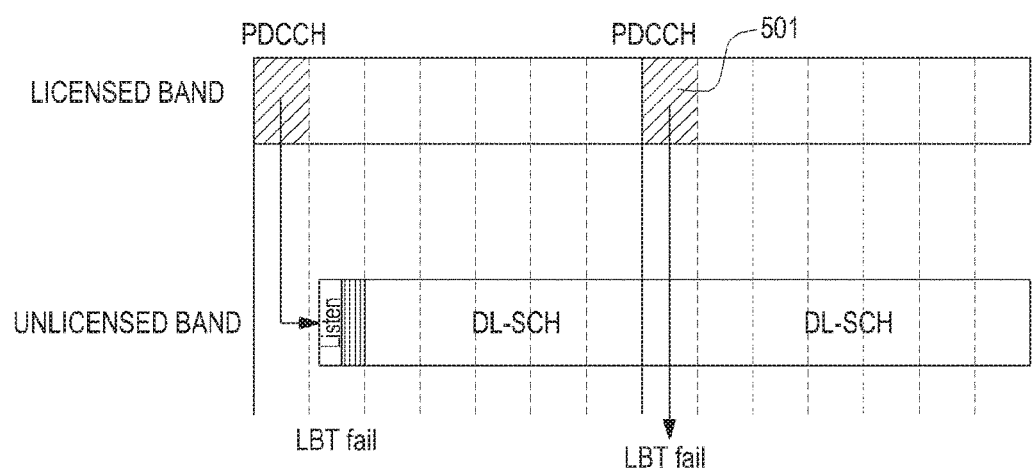
FIG. 5 illustrates an example of a scheduling method in an LTE-U system according to a third method of the present disclosure.

FIG. 5 illustrates an example of a scheduling method in an LTE-U system according to a third method of the present disclosure.

In the third method of scheduling according to the present disclosure, when a user equipment fails in LBT in a first sub-frame, a base station transmits whether the LBT fails to the user equipment through a PDCCH of a second sub-frame (501). The user equipment which has received the PDCCH in the second sub-frame identifies that LBT has failed, does not decode data received thereafter, and does not transmit a NACK signal for a request for retransmission to the base station. When the base station transmits whether the LBT fails to the user equipment through the PDCCH of the second sub-frame, whether LBT succeeds or fails, for each band, may be transmitted to the user equipment by each band. In addition, the PDCCH of the second sub-frame, which includes information on whether the LBT succeeds or fails, may be transmitted in a broadcast manner. Therefore, user equipments, which set a corresponding unlicensed band to be used for an SCell, may receive related-information and utilize the related-information as needed.

Figure 6:
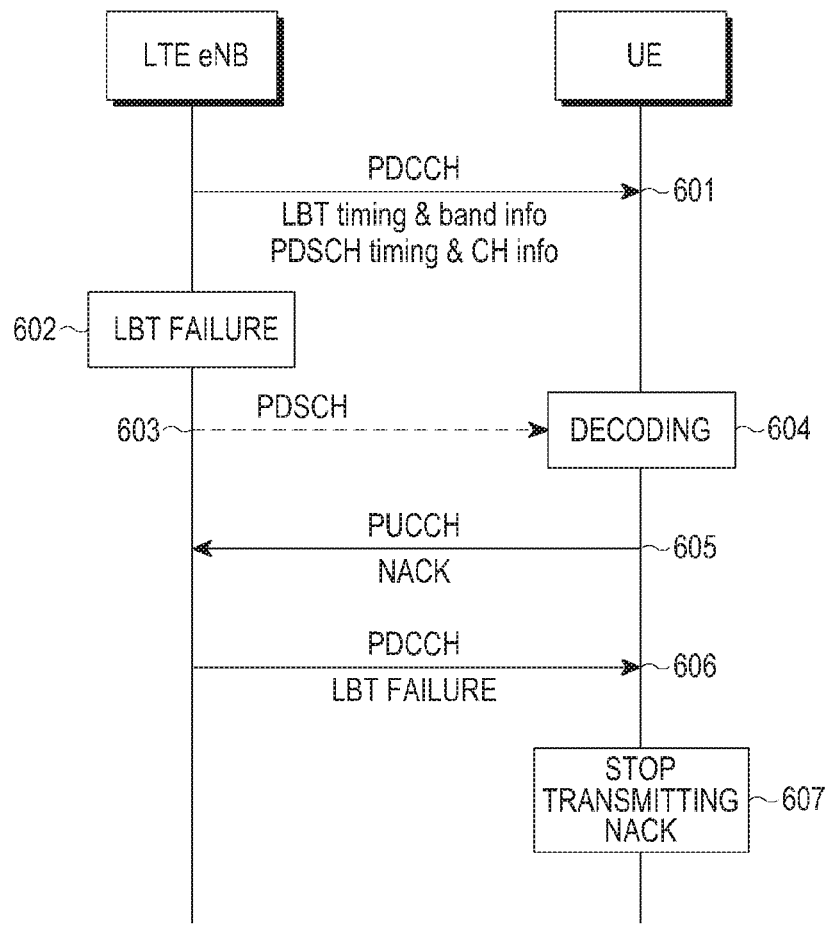
FIG. 6 illustrates a signal flow between a base station and a user equipment according to a third method of the present disclosure.

FIG. 6 illustrates a signal flow between a base station and a user equipment according to a third method of the present disclosure.

Referring to FIG. 6, the base station transmits scheduling information through a PDCCH of a first sub-frame in a licensed band (601). At this time, the scheduling information may include time information and band information for LBT, and scheduling information on a PDSCH of an unlicensed band.

The base station performs LBT and, when the LBT fails (602), cannot transmit downlink data through the PDSCH which has been scheduled in the corresponding unlicensed band (603). Accordingly, since the user equipment fails to receive the downlink data according to the scheduling information of the PDSCH received in the operation 601, the user equipment fails to perform decoding (604). As a result, the user equipment transmits a NACK signal for a request for retransmission to the base station through a PUCCH (605). Thereafter, the base station transmits information indicating that the LBT has failed, through the PDCCH of the second sub-frame in the licensed band, to the user equipment (606), and the user equipment which has received the information stops transmitting the NACK signal (607).

Next, the present disclosure proposes a fourth method in which a base station in an LTE-U system performs downlink scheduling by additionally utilizing a special PDCCH together with a PDCCH of a first sub-frame.

Figure 7:
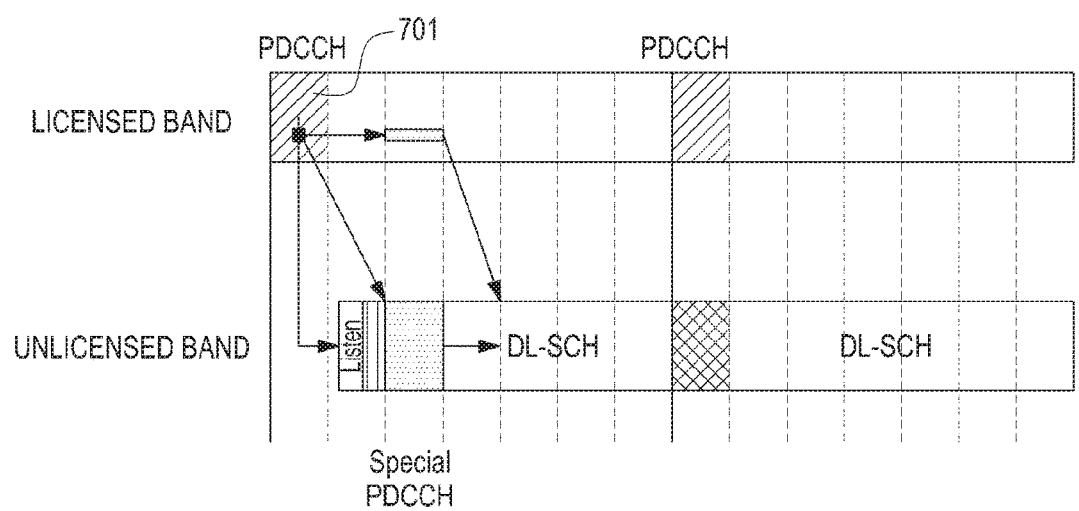
FIG. 7 illustrates an example of a scheduling method in an LTE-U system according to a fourth method of the present disclosure.

FIG. 7 illustrates an example of a downlink scheduling method in an LTE-U system according to a fourth method of the present disclosure.

First of all, a base station transmits, timing information and frequency information of a special PDCCH through which LBT-related information and practical scheduling information are transmitted, through a PDCCH 701 of a first sub-frame in a licensed band. Then, the base station transmits downlink scheduling information through the special PDCCH. In addition, the PDCCH of the first sub-frame may be transmitted in a broadcast manner, and the special PDCCH may be transmitted in a unicast manner to be received by only a corresponding user equipment. In addition, the special PDCCH may be transmitted to the licensed band or the unlicensed band.

Figure 8:
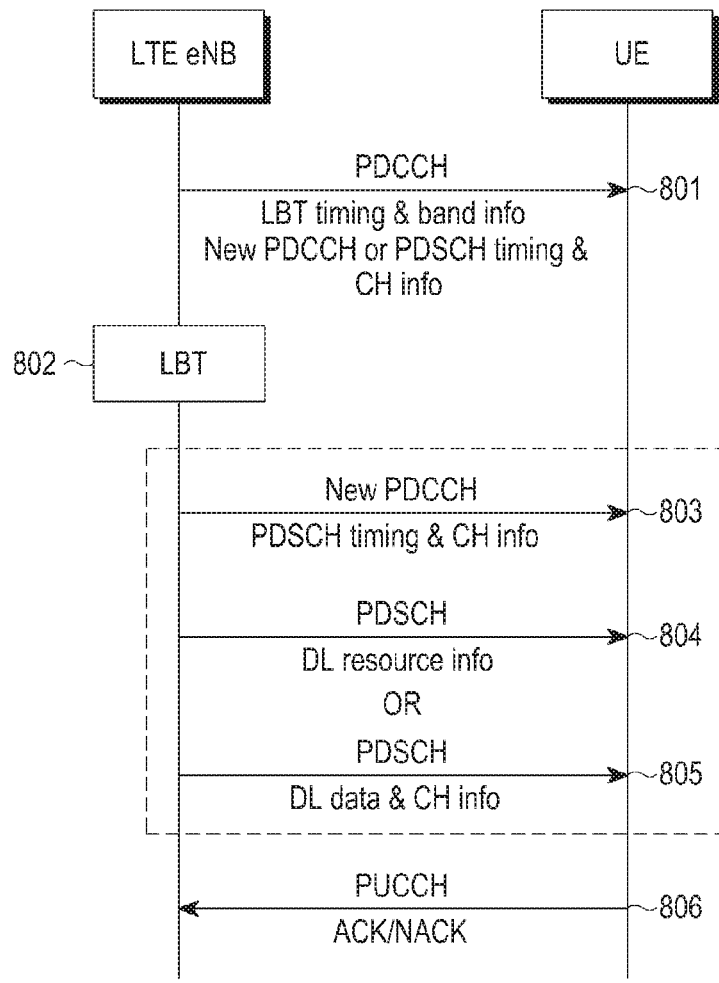
FIG. 8 illustrates a signal flow between a base station and a user equipment according to a fourth method of the present disclosure.

FIG. 8 illustrates a signal flow between a base station and a user equipment according to a fourth method of the present disclosure.

Referring to FIG. 8, a base station transmits scheduling information (transmission band and time information) on a special PDCCH through which time information and band information for LBT and practical downlink scheduling information are transmitted, through a PDCCH of a first sub-frame in a licensed band (801). At this time, the special PDCCH may use a PDCCH of an unlicensed band or a PDSCH of a licensed band. Then, the base station performs LBT and, when the LBT succeeds (802), the base station transmits scheduling information through the special PDCCH on the basis of information transmitted in the operation 801. That is, when the special PDCCH is transmitted by using the PDCCH of the unlicensed band, the base station transmits the scheduling information on the PDSCH of the unlicensed band through the special PDCCH in a corresponding unlicensed band (803), and then transmits resource information for downlink data through the PDSCH of the corresponding unlicensed band (804). When the special PDCCH is transmitted by using the PDSCH of the licensed band, the base station transmits the downlink data through the PDSCH of the corresponding licensed band (805). Then, the user equipment transmits an ACK or a NACK signal to the base station through a PUCCH according to whether reception in the operation 804 or the operation 805 succeeds (806).

Meanwhile, in order to minimize the power consumption of a user equipment in an LTE-U system, the present disclosure proposes an LTE-U DRX control manner, which can be operated in either a scheme different from an existing LTE discontinuous reception (DRX) scheme or a scheme identical to the existing LTE DRX scheme and can be changed according to the situation.

Figure 9:
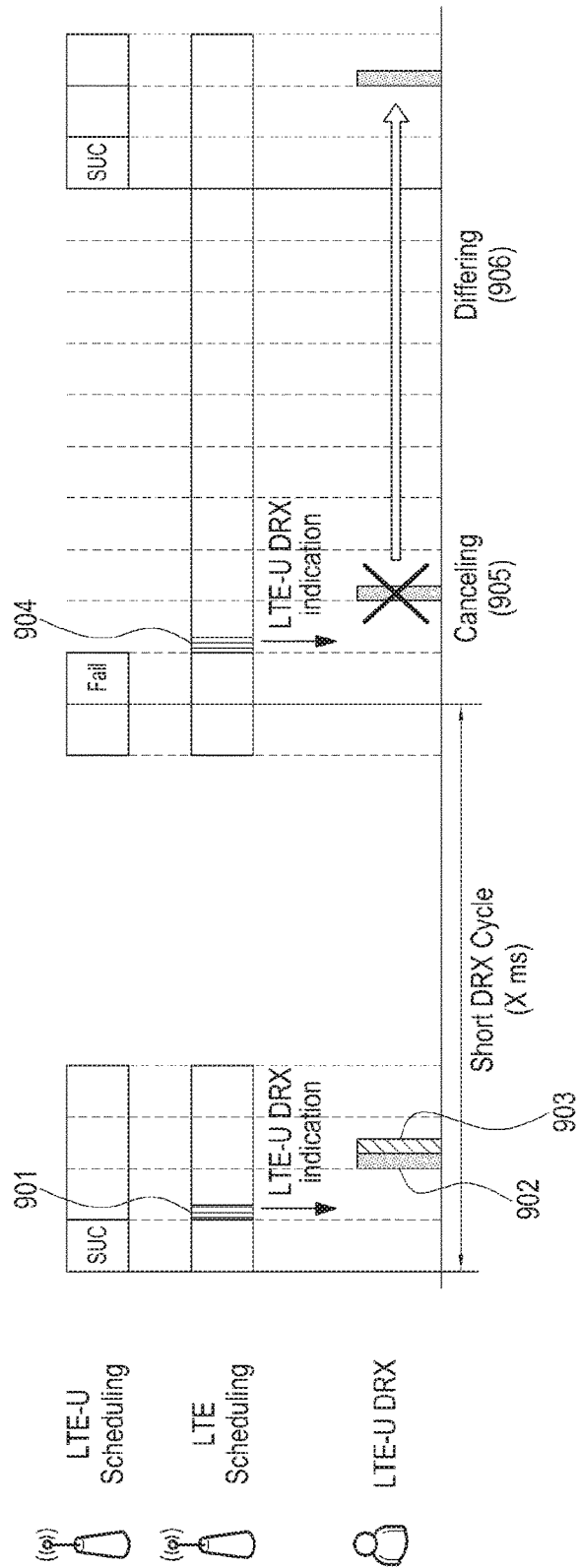
FIG. 9 illustrates a DRX scheme of an LTE-U system according to the present disclosure.

FIG. 9 illustrates a DRX scheme of an LTE-U system.

Traffic of an LTE system mainly includes continuous short packets such as SMS, SNS, and mobile web, and thus a DRX for the LTE system is also performed in a short cycle. However, the traffic of the LTE-U system mainly includes busty bulky packets having a long cycle such as video streaming or software updates. Therefore, when a general DRX scheme of an LTE system is used in the LTE-U system, a user equipment in an idle state should unnecessarily wake up even when the traffic of the LTE-U system has not arrived. Accordingly, the power consumption of the user equipment increases. Therefore, improving the DRX for LTE-U to be suitable for the traffic characteristics of the LTE-U system has an advantage in reducing the user equipment power consumption.

Referring to FIG. 9, the DRX scheme for LTE-U according to the present disclosure uses an LTE-U DRX indication message through a PDCCH at a position which is one sub-frame before a predetermined reception time (on-duration) of the LTE-U DRX to control LTE-U DRX (901, 904).

The corresponding LTE-U DRX indication message may include LBT success/failure information of the base station. When the LTE-U DRX indication message includes the LBT success information, the user equipment receives the PDCCH during a determined on-duration (902). In addition, when the LTE-U DRX indication message includes the LBT success information, for a stable PDCCH reception, the determined on-duration may be extended (903).

When the LTE-U DRX indication message includes the LBT failure information, the user equipment may determine that normal data transmission or reception is impossible in the on-duration within a predetermined section to cancel the on-duration within the predetermined section (905) or to differ the on-duration within the predetermined section (906). When the on-duration is canceled (905), the user equipment normally counts the number of on-duration omission for switching from short DRX to long DRX. The predetermined section may be explicitly indicated through a DRX indication or may be configured to a value appointed between the base station and the user equipment. When the on-duration is delayed (906), since the user equipment will perform a communication during the delayed on-duration after a predetermined time, the user equipment does not count the number of on-duration omission for switching from the short DRX to the long DRX.

If the user equipment has not received the PDCCH during the on-duration, or if the number of on-durations to be canceled is greater than or equal to a threshold value, the user equipment enters a long DRX mode. In addition, when entering the long DRX mode, when it is determined that the idle state of the unlicensed band becomes long, the user equipment gradually increases the long DRX period. The idle state of the unlicensed band may be determined by the number of cancelled on-durations.

Figure 10:
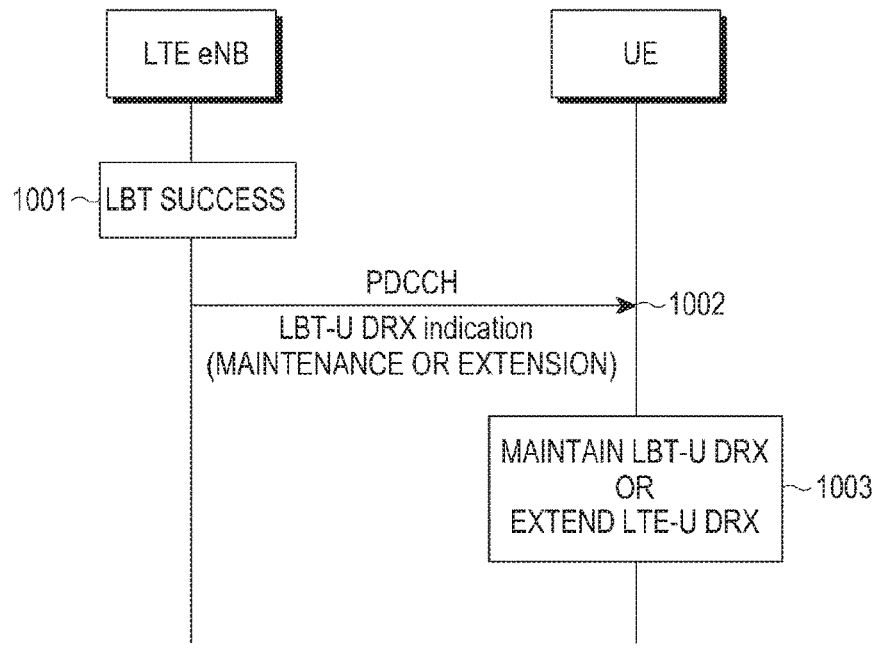
FIGS. 10 to 12 illustrate signal transmission or reception between a base station and a user equipment when a DRX scheme and traffic of an LTE-U system are applied according to the present disclosure.
Figure 11:
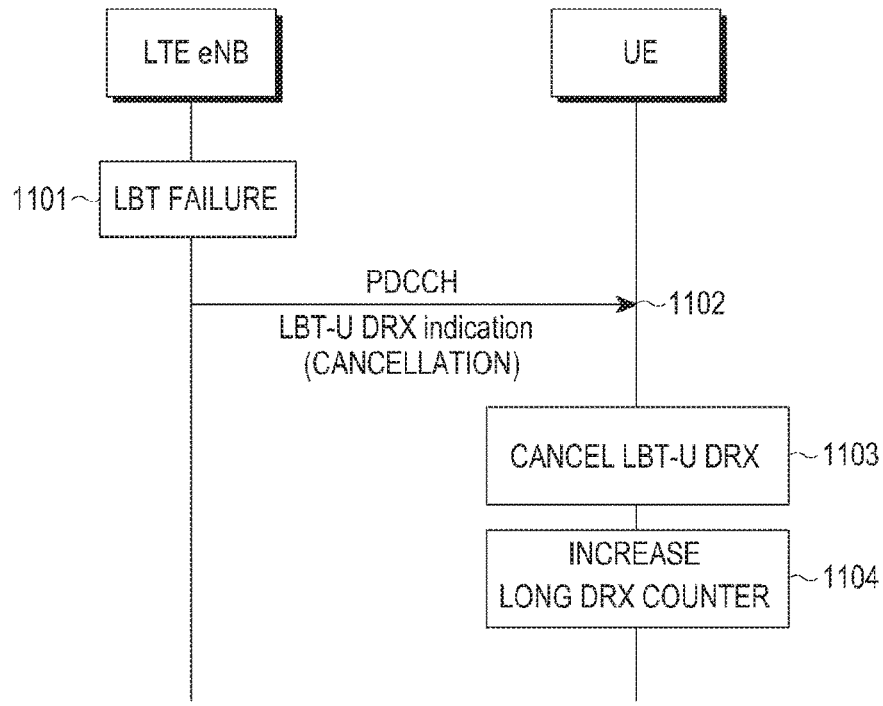
Figure 12:
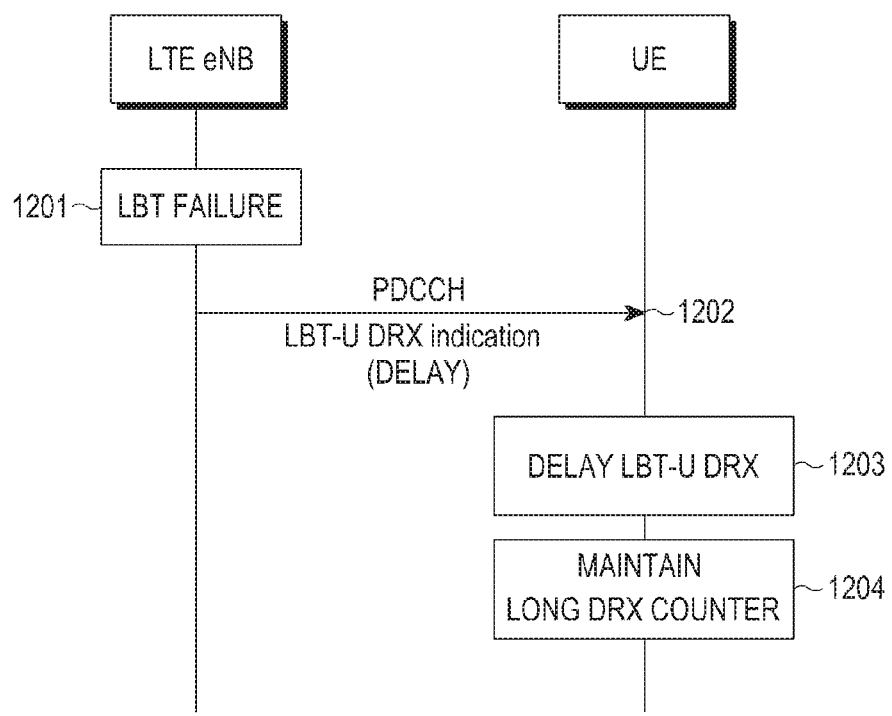

FIGS. 10 to 12 illustrate signal transmission or reception between a base station and a user equipment when traffic and a DRX scheme of an LTE-U system are applied according to the present disclosure.

Referring to FIG. 10, when the LBT succeeds (1001), the base station transmits an LTE-U DRX indication message through a PDCCH of a licensed band (1002). Since the LBT has succeeded, the LTE-U DRX indication message includes information indicating to maintain or extend a currently configured on-duration of LTE-U DRX. In addition, the LTE-U DRX indication message may include LBT success information of the base station. Thereafter, the user equipment maintains or extends the on-duration of the LTE-U DRX, on the basis of the information included in the LTE-U DRX indication message (1003).

Next, referring to FIG. 11, when the LBT fails (1101), the base station transmits an LTE-U DRX indication message through a PDCCH of a licensed band (1102). Since the LBT has failed, the LTE-U DRX indication message may include information indicating to cancel a currently configured on-duration of LTE-U DRX. In addition, the LTE-U DRX indication message may include LBT failure information of the base station. Thereafter, the user equipment cancels the on-duration of the LTE-U DRX on the basis of the information included in the LTE-U DRX indication message (1103), and increases the Long DRX counter by 1 (1104).

In addition, referring to FIG. 12, when the LBT fails (1201), the base station transmits an LTE-U DRX indication message through a PDCCH of a licensed band (1202). Since the LBT has failed, the LTE-U DRX indication message may include information indicating to delay a currently configured on-duration of LTE-U DRX. In addition, the LTE-U DRX indication message may also include LBT failure information of the base station and time information on how long to delay the on-duration. Thereafter, the user equipment delays the on-duration of the LTE-U DRX on the basis of the information included in the LTE-U DRX indication message (1203), and maintains a value of the Long DRX counter at a current value (1204).

Figure 13:
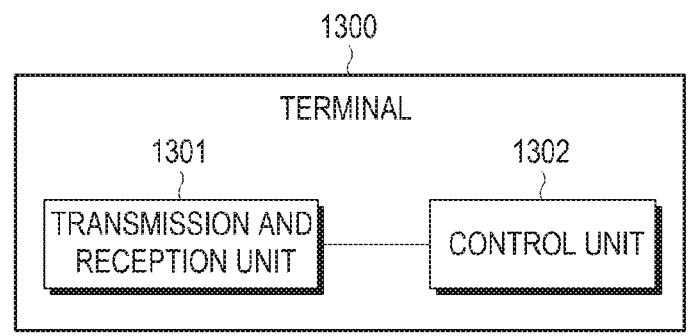
FIG. 13 illustrates an example of a configuration of a user equipment apparatus according to an embodiment of the present disclosure.

FIG. 13 illustrates an example of a configuration of a user equipment apparatus according to an embodiment of the present disclosure.

A user equipment apparatus 1300 may include a transmission and reception unit 1301 that transmits or receives a signal to or from a base station, and may include a control unit 1302 that controls all operations of the user equipment apparatus 1300. It may be understood that operations described as an operation of a user equipment among the operations described in the present disclosure are performed by a control of the control unit 1302.

The control unit 1302 and the transmission and reception unit 1301 are not necessarily implemented as separate components, but may be implemented as a single component like a single chip.

Figure 14:
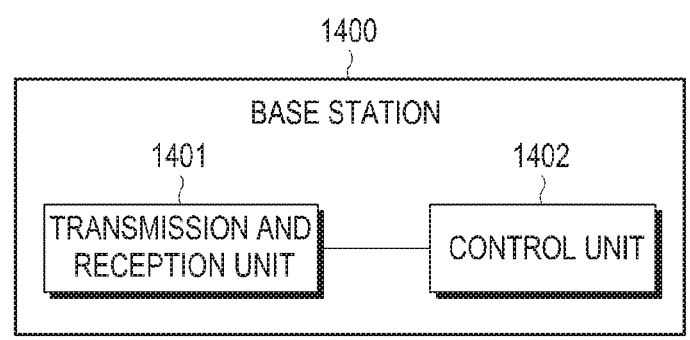
FIG. 14 illustrates an example of a configuration of a base station apparatus according to an embodiment of the present disclosure.

FIG. 14 illustrates an example of a configuration of a base station apparatus according to an embodiment of the present disclosure.

A base station apparatus 1400 may include a transmission and reception unit 1401 that transmits or receives signals to or from other entities of a network and a user equipment, and a control unit 1402 that controls all operations of the base station apparatus 1400. It may be understood that operations described as an operation of a base station among the operations described in the present disclosure are performed by a control of the control unit 1402.

The control unit 1402 and the transmission and reception unit 1401 are not necessarily implemented as separate components, but may be implemented as a single component like a single chip.

It should be noted that the example of the configuration of the LTE-U system and the example of the method illustrated in FIGS. 1 to 14 is not intended to limit the scope of the present disclosure. That is, it should not be construed that all component parts or operations shown in FIGS. 1 to 14 are essential component elements for implementing the present disclosure, and it should be understood that only a few component elements may implement the present disclosure within a scope without departing the subject matter of the present disclosure.

The above described operations may be implemented by providing a memory apparatus storing a corresponding program code to the entity of the communication system, the function, the base station, the load manager, or a specific structural element of the user equipment. That is, the entity, the function, the load manager, or the control unit of the user equipment carries out the above described operations by reading and executing the program code stored in the memory apparatus by means of a processor or a CPU.

The entity, the function, the base station, the load manager, various structural elements of the user equipment, modules and the like may be operated by using a hardware circuit, e.g., a complementary metal oxide semiconductor based logic circuit, firmware, software, and/or a combination of hardware and the firmware and/or software embedded in a machine readable medium. As an example, various electrical structures and methods may be carried out using electrical circuits such as transistors, logic gates, and application specific integrated circuits (ASICs).

While the present invention has been shown and described with reference to certain embodiments thereof, it will be understood by those skilled in the art that various changes in form and details may be made therein without departing from the scope of the present invention. Therefore, the scope of the present invention should not be defined as being limited to the embodiments, but should be defined by the appended claims and equivalents thereof.

The invention claimed is:

1. A method for scheduling a user equipment using an unlicensed band channel by a base station in a communication system, comprising:
    transmitting first downlink control information on a physical downlink control channel (PDCCH) to the user equipment through a licensed band channel in a first sub-frame, the first downlink control information comprising scheduling information for the unlicensed band channel;
    determining availability of the unlicensed band channel;
    if the unlicensed band channel is available in the first sub-frame, transmitting scheduling information for the unlicensed band channel to the user equipment through the licensed band channel in a second sub-frame immediately subsequent the first sub-frame and subsequent sub-frames, and transmitting downlink data to the user equipment through the unlicensed band channel in the first sub-frame, the second sub-frame, and the subsequent sub-frames based on the scheduling information; and
    if the unlicensed band channel is not available in the first sub-frame, broadcasting second downlink control information on the PDCCH through the licensed band channel in the second sub-frame, the second downlink control information comprising indication information indicating that the unlicensed band channel is not available, and receiving a signal for a request for retransmission from the user equipment,
    wherein if the unlicensed band channel is not available in the first sub-frame, downlink data corresponding to the scheduling information is not transmitted in the first sub-frame.

2. The method of claim 1, wherein the scheduling information comprises at least one of a listening start time and a listening end time for searching for the unlicensed band channel, band information to be listened for, a retry start time in a case of a listening failure, or a number of retries in a case of a listening failure,
    wherein the base station broadcasts the scheduling information.

3. The method of claim 1, wherein the base station transmits the downlink data through a symbol firstly transmitted after successfully searching for the unlicensed band channel and occupying the unlicensed band channel.

4. The method of claim 1, wherein third downlink control information (DCI) and subsequent DCI on the PDCCH are transmitted through the licensed band channel or the unlicensed band channel in the subsequent sub-frames, and wherein information for the licensed band channel transmitting the third DCI and the subsequent DCI or the unlicensed band channel transmitting the third DCI and the subsequent DCI is transmitted in the first sub-frame.

5. A base station apparatus for scheduling a user equipment using an unlicensed band channel in a communication system, comprising:
    a transceiver configured to transmit or receive data; and
    a controller configured to:
        control the transceiver to transmit first downlink control information on a physical downlink control channel (PDCCH) to the user equipment through a licensed band channel in a first sub-frame, the first downlink control information comprising scheduling information for the unlicensed band channel,
        determining availability of the unlicensed band channel,
        if the unlicensed band channel is available in the first sub-frame, transmit scheduling information for the unlicensed band channel to the user equipment through the licensed band channel in a second sub-frame immediately subsequent the first sub-frame and subsequent sub-frames, and transmit downlink data to the user equipment through the unlicensed band channel in the first sub-frame, the second sub-frame, and the subsequent sub-frames based on the scheduling information, and
        if the unlicensed band channel is not available in the first sub-frame, broadcast second downlink control information on the PDCCH through the licensed band channel in the second sub-frame, the second downlink control information comprising indication information indicating that the unlicensed band channel is not available, and receive a signal for a request for retransmission from the user equipment,
    wherein if the unlicensed band channel is not available in the first sub-frame, downlink data corresponding to the scheduling information is not transmitted in the first sub-frame.

6. The base station apparatus of claim 5, wherein the scheduling information comprises at least one of a listening start time and a listening end time for searching for the unlicensed band channel, band information to be listened for, a retry start time in a case of a listening failure, or a number of retries in a case of a listening failure,
    wherein a transmission and reception unit broadcasts the scheduling information.

7. The base station apparatus of claim 5, wherein the controller is further configured to control the transceiver to transmit the downlink data through a symbol firstly transmitted after a search for the unlicensed band channel has succeeded and the unlicensed band channel has been occupied.

8. The base station apparatus of claim 5, wherein the controller is further configured to control the transceiver to transmit third downlink control information (DCI) and subsequent DCI on the PDCCH through the licensed band channel or the unlicensed band channel in the subsequent sub-frames, and to transmit information for the licensed band channel transmitting the third DCI and the subsequent DCI or the unlicensed band channel transmitting the third DCI and the subsequent DCI in the first sub-frame.

9. A method in which a user equipment using an unlicensed band channel is scheduled in a communication system, comprising:
    receiving first downlink control information on a physical downlink control channel (PDCCH) from a base station through a licensed band channel in a first sub-frame, the first downlink control information comprising scheduling information for the unlicensed band channel;
    performing data decoding through the unlicensed band channel in the first sub-frame based on the scheduling information;
    receiving second downlink control information on the PDCCH from the base station through the licensed band channel in a second sub-frame immediately subsequent the first sub-frame;

determining whether the second downlink control information comprises indication information indicating that the unlicensed band channel is not available;

if the indication information is not comprised in the second downlink control information, receiving scheduling information for the unlicensed band channel from the base station through the licensed band channel in the second sub-frame and subsequent sub-frames, and receiving downlink data from the base station through the unlicensed band channel in the second sub-frame and the subsequent sub-frame; and if the indication information is comprised in the second downlink control information, transmitting a signal for a request retransmission to the base station, and preventing data decoding through the unlicensed band channel in the second sub-frame, wherein the indication information is transmitted in a broadcast manner.

10. The method of claim 9, wherein the scheduling information comprises at least one of a listening start time and a listening end time for searching for the unlicensed band channel, band information to be listened for, a retry start time in a case of a listening failure, or a number of retries in a case of a listening failure, wherein the scheduling information is transmitted in a broadcast manner.

11. The method of claim 9, wherein the base station receives downlink data through a symbol firstly transmitted after successfully searching for the unlicensed band channel and occupying the unlicensed band channel.

12. The method of claim 9, wherein third downlink control information (DCI) and subsequent DCI on the PDCCH are received through the licensed band channel or the unlicensed band channel in the subsequent sub-frames, and wherein information for the licensed band channel transmitting the third DCI and the subsequent DCI or the unlicensed band channel transmitting the third DCI and the subsequent DCI is received in the first sub-frame.

13. A user equipment apparatus which is scheduled by a base station in a communication system, comprising:

a transceiver configured to transmit or receive data; and
a controller configured to:
control the transceiver to receive first downlink control information on a physical downlink control channel (PDCCH) from the base station though a licensed band channel in a first sub-frame, the first downlink control information comprising scheduling information for an unlicensed band channel, perform data decoding through the unlicensed band channel in the first sub-frame based on the scheduling information, control the transceiver to receive second downlink control information on the PDCCH from the base station through the licensed band channel in a second sub-frame immediately subsequent to the first sub-frame, determine whether the second downlink control information comprises indication information indicating that the unlicensed band channel is not available, if the indication information is not comprised in the second downlink control information, receive scheduling information for the unlicensed band channel from the base station through the licensed band channel in the second sub-frame and subsequent sub-frames, and receive downlink data from the base station through the unlicensed band channel in the second sub-frame and the subsequent sub-frame, and if the indication information is comprised in the second downlink control information, transmit a signal for a request for retransmission to the base station, and prevent data decoding through the unlicensed band channel in the second sub-frame, wherein the indication information is transmitted in a broadcast manner.

14. The user equipment apparatus of claim 13, wherein the scheduling information comprises at least one of a listening start time and a listening end time for searching for the unlicensed band channel, band information to be listened for, a retry start time in a case of a listening failure, or a number of retries in a case of a listening failure, wherein the scheduling information is transmitted in a broadcast manner.

15. The user equipment apparatus of claim 13, wherein the controller is further configured to control the transceiver to receive downlink data through a symbol firstly transmitted after the base station successfully searches for the unlicensed band channel and occupies the unlicensed band channel.

16. The user equipment apparatus of claim 13, wherein the controller is further configured to control the transceiver to receive third downlink control information (DCI) and subsequent DCI on the PDCCH through the licensed band channel or the unlicensed band channel in the subsequent sub-frames, and to receive information for the licensed band channel transmitting the third DCI and the subsequent DCI or the unlicensed band channel transmitting the third DCI and the subsequent DCI in the first sub-frame.

* * * * *